(12) United States Patent
Fiederle et al.

(10) Patent No.: US 11,654,602 B2
(45) Date of Patent: May 23, 2023

(54) PLASTICIZING UNIT

(71) Applicant: KRAUSSMAFFEI TECHNOLOGIES GMBH, Munich (DE)

(72) Inventors: Ralf Fiederle, Eglofs (DE); Matthias Roick, Germering (DE); Udo Schneider, Munich (DE); Ivan Rados, Olching (DE); Oliver Sacher, Mering (DE); Uwe Konnerth, Munich (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 12 days.

(21) Appl. No.: 17/258,223

(22) PCT Filed: Jul. 18, 2019

(86) PCT No.: PCT/EP2019/069319
§ 371 (c)(1),
(2) Date: Jan. 6, 2021

(87) PCT Pub. No.: WO2020/025331
PCT Pub. Date: Feb. 6, 2020

(65) Prior Publication Data
US 2021/0268701 A1  Sep. 2, 2021

(30) Foreign Application Priority Data
Jul. 30, 2018  (DE) ............... 10 2018 118 376.3

(51) Int. Cl.
*B29C 45/17* (2006.01)
*B29C 45/50* (2006.01)
(Continued)

(52) U.S. Cl.
CPC ...... *B29C 45/1773* (2013.01); *B29C 45/1761* (2013.01); *B29C 45/5008* (2013.01);
(Continued)

(58) Field of Classification Search
CPC ............ B29C 45/1773; B29C 45/1761; B29C 45/1747
See application file for complete search history.

(56) References Cited

U.S. PATENT DOCUMENTS 4,808,103 A * 2/1989 Hehl ................. B29C 45/17
425/574
4,863,368 A * 9/1989 Hehl .................. B29C 45/1773
425/572
(Continued)

FOREIGN PATENT DOCUMENTS

CA         2607390 A1 * 4/2009 ......... B29C 45/5008
CN       204687230 U     10/2015
(Continued)

OTHER PUBLICATIONS

Machine translation JPH06198676A (Year: 1994).*
(Continued)

*Primary Examiner* — Matthew J Daniels
*Assistant Examiner* — Wayne K. Swier
(74) *Attorney, Agent, or Firm* — Pearne & Gordon LLP

(57) ABSTRACT

A plasticizing unit is provided for an injection unit of an injection moulding machine with a support element arranged beneath the cylinder and connected therewith. To simplify adjusting of the nozzle centre, a fixing element surrounds the end of the support element facing away from the cylinder such that a distance is present between the fixing element and the support element. Several adjusting elements are provided, to produce a force-fitting and/or form-fitting connection between the fixing element and the support element to adjust the position of the support element relative to the fixing element in a plane orthogonally to the cylinder axis. The plasticizing unit can be clamped in and out with its fixing element in a clamping- and positioning system con-
(Continued)

nected with the machine bed. On changeover of the plasticizing unit, an adjusting of the nozzle centre, which has been carried out once, is retained.

8 Claims, 5 Drawing Sheets

(51) Int. Cl.
*B29C 45/60* (2006.01)
*B29C 45/62* (2006.01)
(52) U.S. Cl.
CPC .............. *B29C 45/60* (2013.01); *B29C 45/62* (2013.01); *B29C 45/176* (2013.01)

(56) References Cited

U.S. PATENT DOCUMENTS

| | | | | |
|---|---|---|---|---|
| 5,314,327 | A | * | 5/1994 | Stein ................... B29C 45/1761 425/451.2 |
| 10,525,625 | B2 | | 1/2020 | Dirneder et al. |
| 2007/0087080 | A1 | * | 4/2007 | Weinmann .............. B29C 45/07 425/574 |
| 2011/0151048 | A1 | | 6/2011 | Schad et al. |

FOREIGN PATENT DOCUMENTS

| | | | | |
|---|---|---|---|---|
| CN | 204800937 | U | | 11/2015 |
| CN | 108247969 | A | * | 7/2018 ............. B29C 45/03 |
| DE | 134614 | A1 | | 3/1979 |
| DE | 3637885 | A1 | | 5/1988 |
| DE | 288350 | A1 | | 3/1991 |
| DE | 288350 | A5 | | 3/1991 |
| DE | 202006012268 | A1 | | 4/2007 |
| DE | 102017003525 | A1 | | 10/2017 |
| GB | 2156266 | A | * | 10/1985 ............. B29C 45/03 |
| JP | 06198676 | A | * | 7/1994 ......... B29C 45/1773 |
| JP | H06198676 | A | | 7/1994 |
| JP | H0911276 | A | * | 1/1997 ......... B29C 45/5008 |
| JP | 2001-170967 | A | | 6/2001 |
| JP | 2017-159549 | A | | 9/2017 |

OTHER PUBLICATIONS

Machine translation JPH0911276A (Year: 1997).*
Machine translation CN108247969A (Year: 2018).*
"Extruder Barrel Alignment", The Advanced Team, Inc., pp. 1-12, 2015, http://32sceu2lutxd3gqs9m34vh0p.wpengine.netdna-cdn.com/wp-content/uploads/2016/02/Extruder-Alignment-Paper-2015.pdf.
International Search Report for PCT/EP2019/069319, dated Nov. 28, 2019.
Internatinoal Preliminary Report on Patentability for PCT/EP2019/069319, dated Jul. 29, 2020.
Office action in connection with the corresponding Chinese application 201980046911.9 dated Apr. 7, 2022.

* cited by examiner

PLASTICIZING UNIT

CROSS-REFERENCE TO RELATED APPLICATIONS

This is a National Stage application of PCT international application PCT/EP2019/069319 filed on Jul. 18, 2019, which claims the priority of German Application No. 10 2018 118 376.3, filed Jul. 30, 2018, which are incorporated herein by reference in their entireties.

FIELD OF THE INVENTION

The invention relates to a plasticizing unit for an injection unit of an injection moulding machine, with a cylinder and with a screw which is rotatable therein and movable in axial direction.

BACKGROUND OF THE INVENTION

In an injection moulding machine, it can be necessary from time to time to change the plasticizing unit. From DE3637885A1 an injection moulding system with a replaceable plasticizing unit is known. In order to shorten the change-over times to a minimum a pre-heating station is provided, in which the plasticizing units are connected to a supply connection and can be pre-heated under operating conditions. For the rapid and preferably automatic fastening or respectively detaching of the plasticizing units in the injection station or respectively in the pre-heating station, there are provided respectively a trough-shaped mount and clamping devices with wedges which interact axially and radially with corresponding wedge surfaces on the plasticizing unit.

The adjusting of the nozzle centre proves to be problematic in a changing of the plasticizing unit. It must be aligned exactly to the sprue bushing of the injection moulding tool half on the nozzle side. For this, it is necessary that the nozzle centre is aligned centrally in the centring ring on the fixed platen. In order to be able to achieve this, a certain effort must be carried out. In particular, the injection moulding tool must firstly be dismantled so that sufficient space is available between the platens for an operator who can look from the interior of the clamping unit onto the nozzle tip and align it centrally in the centring ring. After the adjustment has been completed, the injection moulding tool must be installed again. This can take several hours per change of a plasticizing unit.

BRIEF SUMMARY OF THE INVENTION

Proceeding herefrom, the invention is based on the problem of indicating a plasticizing unit which enables an easy and time-saving change of the plasticizing unit, and wherein the nozzle centre only has to be adjusted once per plasticizing unit.

The solution to this problem occurs through a plasticizing unit having the features of Claim 1. Advantageous embodiments and further developments are to be found in the dependent claims.

Through the fact that a fixing element surrounds the end of the support element of the cylinder facing away from the cylinder, such that a distance is present between the fixing element and the support element, and that between the fixing element and the support element several adjusting elements are provided, which are configured to be able to produce a force-fitting and/or form-fitting connection between the fixing element and the support element and to adjust the position of the support element relative to the fixing element in a plane orthogonally to the cylinder axis, the nozzle centre for such a plasticizing unit is to be adjusted only one single time. In the case of a change of the plasticizing unit, the fixing element remains on the plasticizing unit and therefore also the adjustment of the nozzle centre which was carried out once by means of the adjusting elements is retained.

According to an embodiment of the invention, three adjusting elements can be provided and arranged as described below. A first adjusting element can lie with its symmetry axis in the plane which is vertical and containing the cylinder axis, wherein this first adjusting element is arranged beneath the support element and is configured for an adjusting of the position of the support element relative to the fixing element in vertical direction. In addition, two further adjusting elements can be provided, the symmetry axes of which lie in a vertical plane which lies orthogonally to the cylinder axis, wherein on each side of the plane which is vertical and containing the cylinder axis respectively one of the two further adjusting elements is arranged and is configured for an adjusting of the position of the support element relative to the fixing element in horizontal direction. Preferably, the symmetry axes of all three adjusting elements can be arranged in a plane orthogonally to the cylinder axis. In addition, the symmetry axes of the two further adjusting elements can preferably lie on a common axis.

In further development of the invention, provision can be made that the fixing element, in a plane orthogonally to the cylinder axis, has substantially a rectangular and upwardly open cross-section, in particular in the manner of a U-profile, or respectively a U-shaped cross-section, with two side parts and a flat or respectively straight base part. Thereby, the fixing element can be clamped with its side walls between the clamping elements of a clamping- and positioning system and can be fixed in its position.

In addition, at its lower end, which is connected with the fixing element via the adjusting elements, the support element can be preferably configured in an analogous manner to the fixing element and namely in such a way that an end portion of the support element projects into the fixing element.

The invention relates furthermore to an injection unit with a plasticizing unit according to the invention and with a drive unit, comprising a rotary- and a linear drive for the screw, wherein the plasticizing unit is connectable or connected with the drive unit in a detachable manner.

According to an aspect of the invention, a carrier plate can be provided, on which the fixing element or respectively the plasticizing unit is able to be supported with its fixing element and on which a clamping- and positioning system is provided, which is configured to clamp the fixing element, supported on the carrier plate, and to fix it in its position. According to a preferred embodiment, a linear guide can be provided for the carrier plate.

In addition, guide elements can be provided between the carrier plate on the one hand and the underside of the fixing element on the other hand, which are configured and interact in such a way that the fixing element is fixed in position in longitudinal direction of the injection unit and is displaceable orthogonally to the cylinder axis on the carrier plate. Thereby, the first aligning of the plasticizing unit in the clamping- and positioning system is facilitated.

Finally, the invention also relates to an injection moulding machine with a machine bed, a clamping unit and an injection unit according to the invention, or respectively an injection unit with a plasticizing unit according to the invention, wherein the carrier plate of the injection unit is supported displaceably in longitudinal direction of the machine on or in the machine bed, preferably by means of suitable linear guides. A linear guide can be, for example, a guide rail with a suitable cross-section and guide carriages matching hereto, wherein the guide carriages are fastened on the underside of the carrier plate.

BRIEF DESCRIPTION OF THE DRAWINGS

The invention is to be described in closer detail below with the aid of an example embodiment and with reference to FIGS. 1 to 16.

There are shown.

DESCRIPTION OF EXAMPLE EMBODIMENTS

Figure 1:
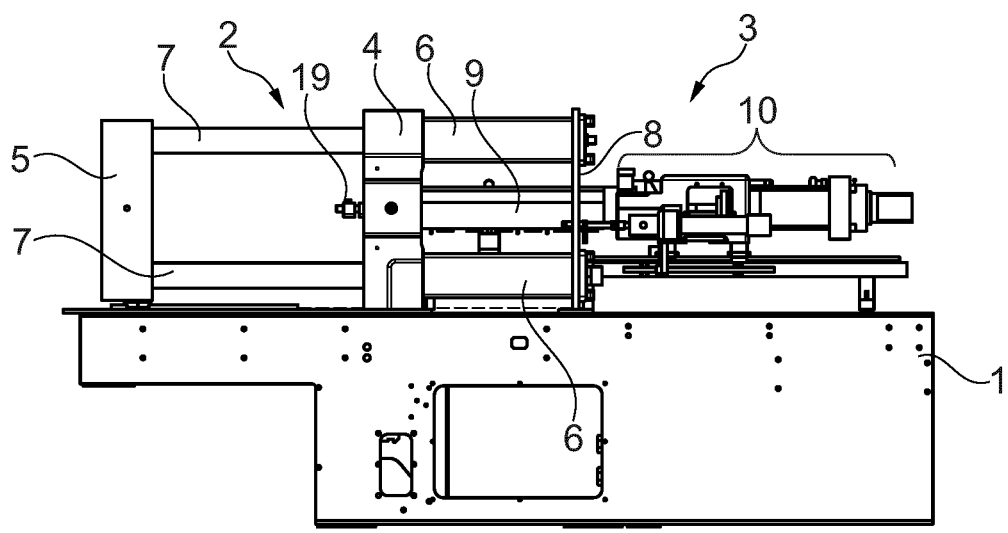
FIG. 1 injection moulding machine in side view
FIG. 2 front view of the injection unit
FIG. 3 clamping- and positioning system in closed state
FIG. 4 clamping- and positioning system in opened state
FIG. 5-12 illustration of the steps at the first set-up of the plasticizing unit
FIG. 13-16 illustration of the steps on changing of the plasticizing unit

The injection moulding machine shown in side view in Figure comprises a machine bed 1, a clamping unit 2 and an injection unit 3. The clamping unit 2 comprises a fixed platen 4, a movable platen 5, four clamping cylinders 6 and four columns 7, which are connected with the movable platen 5 and project into the clamping cylinders 6 and have there an end which is configured as a piston. In FIG. 1 only the front clamping cylinders and the front columns can be seen.

The upper and lower clamping cylinders lying respective on a side of the injection unit 3 are connected with one another by means of support plates 8 and supported on the machine bed 1. The injection unit 3 comprises a plasticizing unit 9 according to the invention with a nozzle 19 and a drive unit 10, comprising a rotary- and a linear drive, which are known per se and therefore do not have to be described in closer detail.

Figure 2:
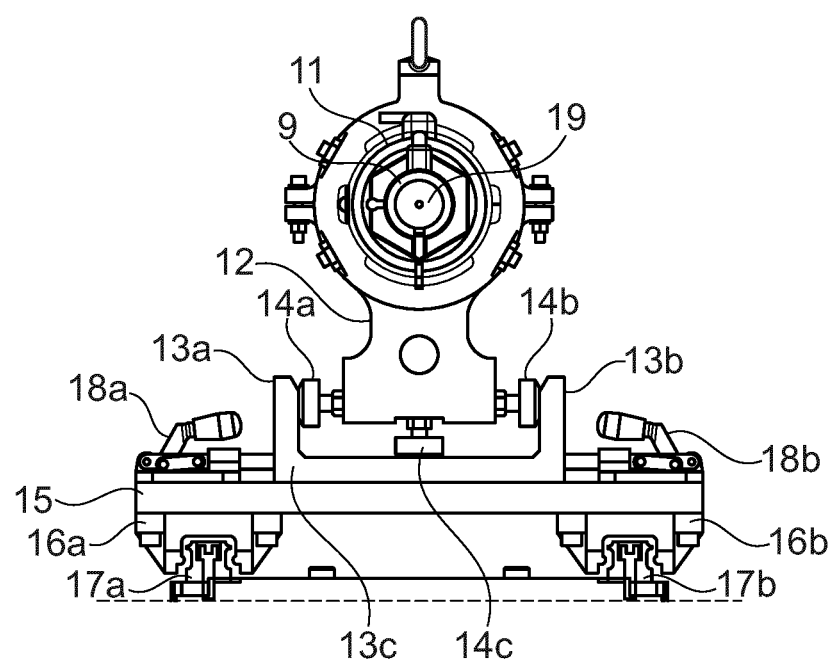

FIG. 2 shows a front view of FIG. 1 onto the injection unit 3. The plasticizing unit 9 comprises a cylinder 11 and a screw (not illustrated), rotatable therein and movable in axial direction. At the front end of the plasticizing unit 9 a nozzle 19 is situated. Beneath the cylinder 11 a support element 12 is arranged and is connected with the cylinder 11. The lower end of the support element 12 is configured to be substantially rectangular and is surrounded by a fixing element 13. The fixing element 13 has, in a plane orthogonally to the cylinder axis, substantially a rectangular and upwardly open cross-section, in particular in the manner of a U profile with two side parts 13a and 13b and a flat or respectively straight base part 13c. Between the support element 12 and the fixing element 13, three adjusting elements 14a, 14b and 14c are provided.

The three adjusting elements 14a, 14b, 14c are arranged lying in a plane orthogonally to the cylinder axis, wherein the adjusting element 14c is arranged beneath the support element 14 and is in contact with the base part 13c of the fixing element or is connected therewith. This adjusting element 14c is configured for an adjusting of the position of the support element 12 relative to the fixing element 13 in vertical direction. The symmetry axis of the adjustment element 14c preferably lies in a plane which is vertical and containing the cylinder axis. On each side of a plane which is vertical and containing the cylinder axis, a further adjustment element 14a and 14b is respectively arranged. These adjustment elements 14a and 14b are arranged laterally to the support element 12 and are aligned to the side parts 13a and 13b of the fixing element 13. The adjustment elements 14a and 14b are configured for an adjusting of the position of the support element 12 relative to the fixing element 13 in horizontal direction.

The plasticizing unit 9 is supported with its fixing element 13 on a carrier plate 15. The carrier plate 15 is supported by means of guide carriages 16a and 16b on guide rails 17a, 17b and is movable in longitudinal direction of the machine.

Figure 3:
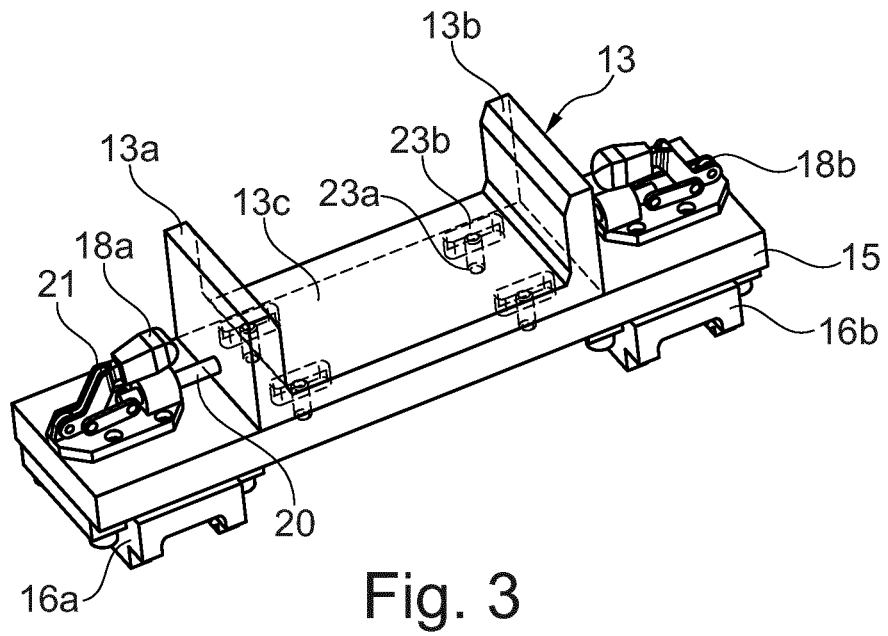
Figure 4:
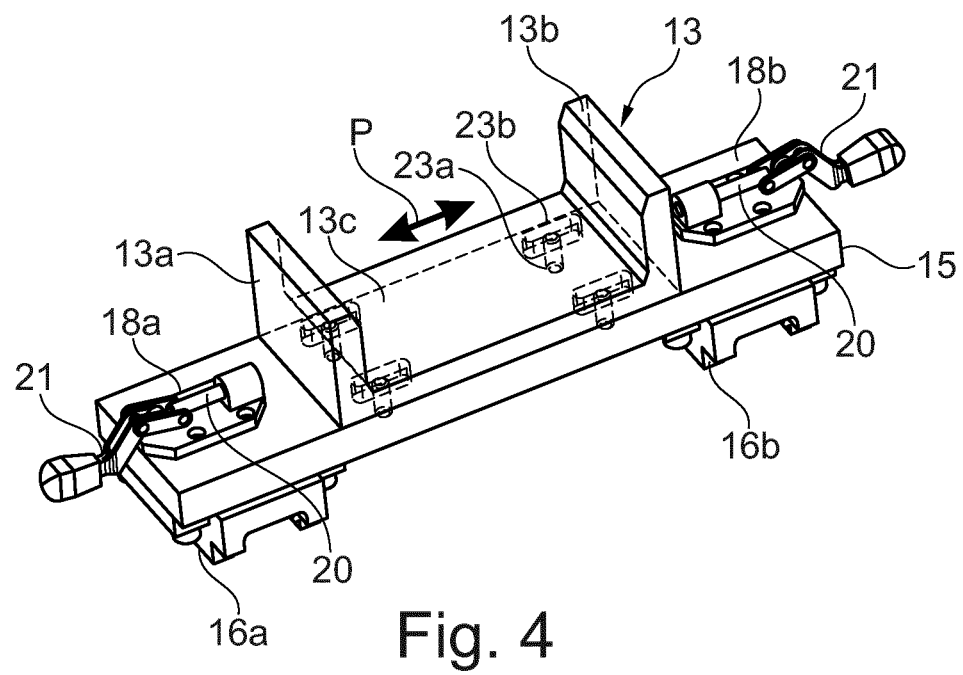
Figure 6:
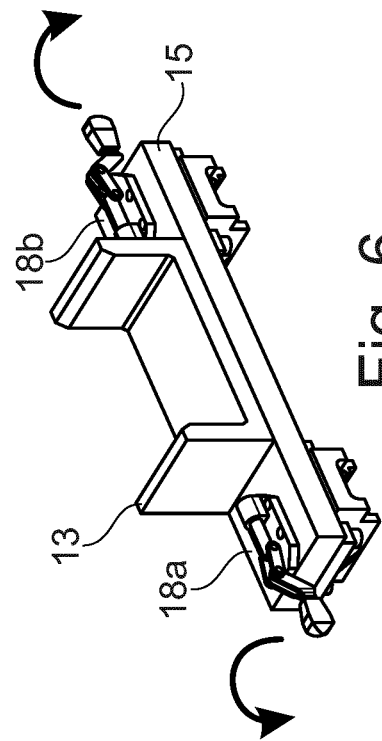
Figure 8:
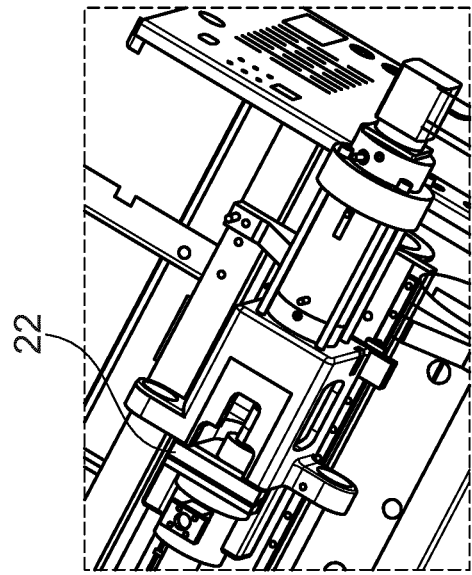
Figure 5:
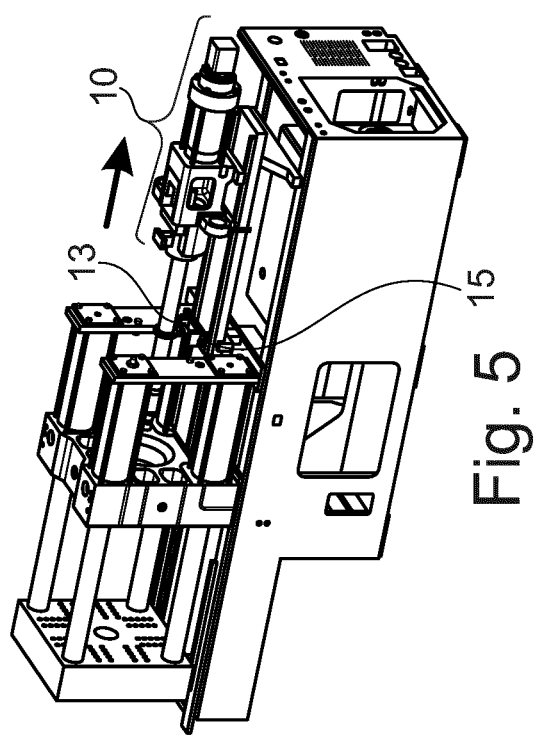
Figure 7:
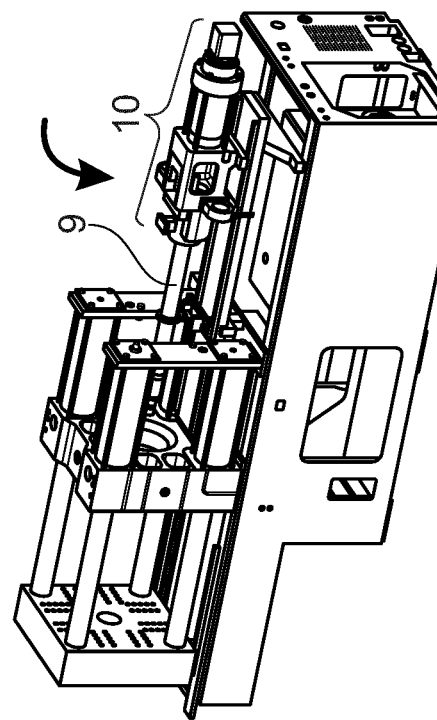
Figure 10:
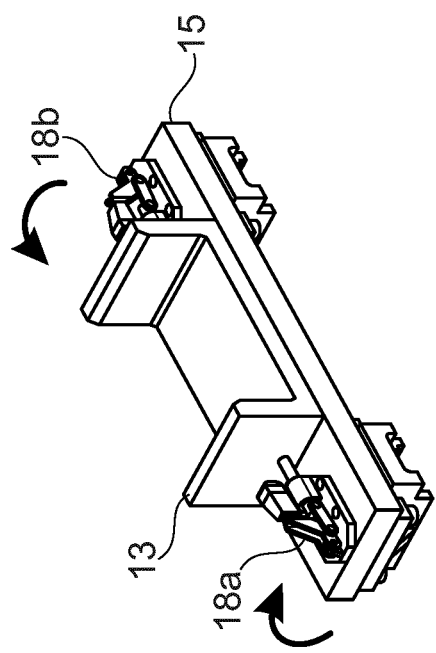
Figure 9:
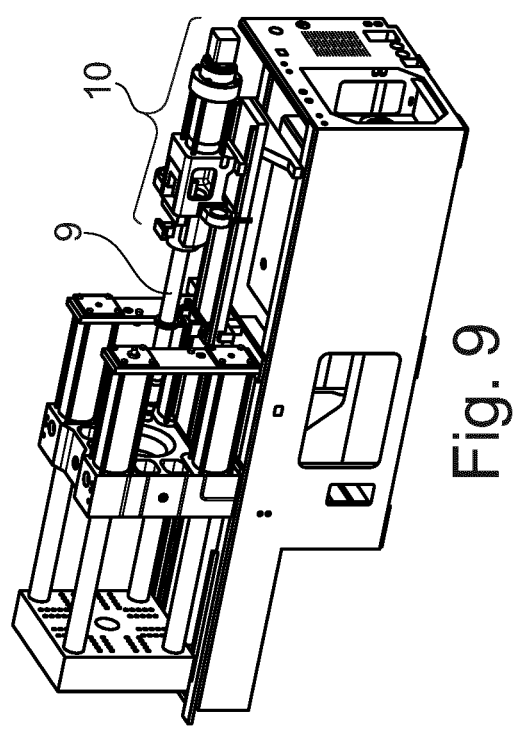
Figure 12:
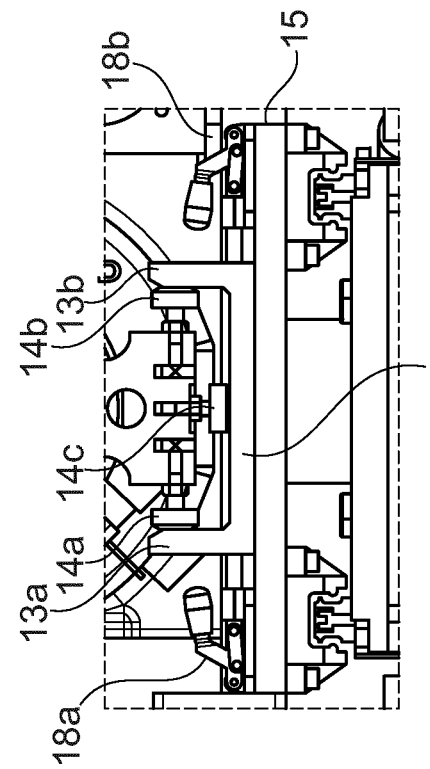
Figure 11:
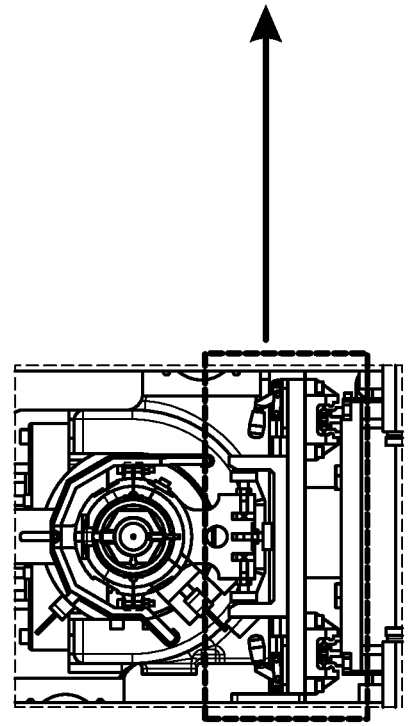
Figure 14:
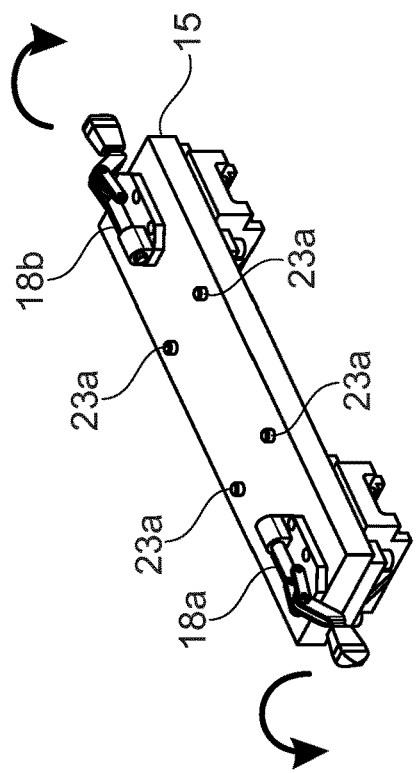
Figure 16:
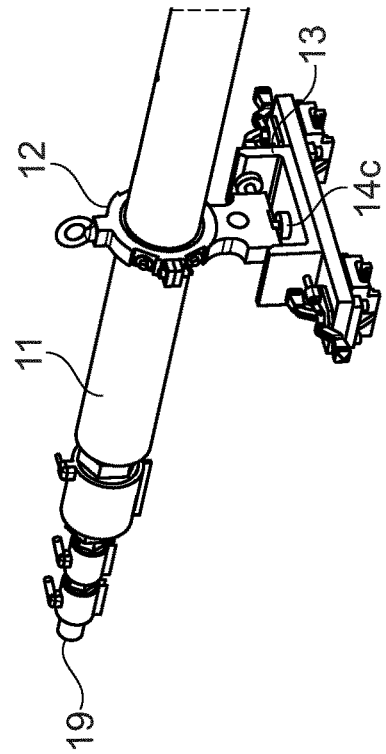
Figure 13:
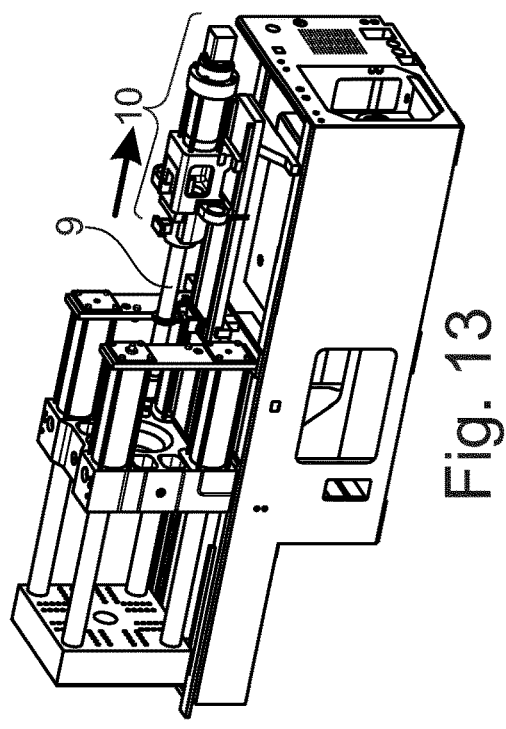
Figure 15:
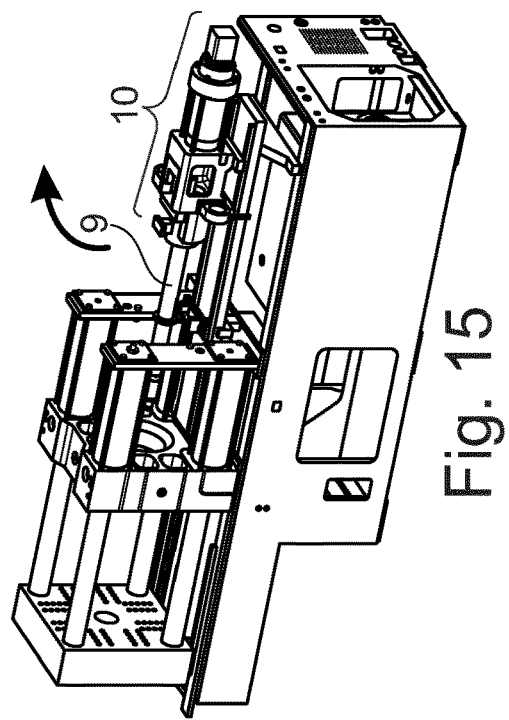

On the upper side of the carrier plate 15 a clamping- and positioning system is mounted, which according to the present example embodiment consists of two clamping elements 18a and 18b. On both sides of the fixing element 13, respectively a clamping element 18a or respectively 18b is mounted, which is to be described in closer detail with reference to FIGS. 3 and 4. The clamping elements 18a and 18b are illustrated in FIG. 3 in the closed position and in FIG. 4 in the opened position. In the opened position according to FIG. 4, the fixing element 13 is displaceable orthogonally to the cylinder axis. This play is intended to be indicated by the arrow P. In the closed position according to FIG. 3, the fixing element is fixed in its position and is clamped securely between the clamping elements 18a and 18b. By means of suitable guide elements, it can be ensured that the fixing element 13 is only movable orthogonally to the cylinder axis, whereas it is fixed in position in the longitudinal direction of the injection unit. The guide elements can be configured for example in such a way that on the upper side of the carrier plate 15 several guide pins 23a are provided, which are in engagement with guide grooves 23b, configured in a matching manner hereto, on the underside of the fixing element 13.

The clamping elements of the clamping- and positioning systems can be configured in a variety of ways. According to the present example embodiment, each of the clamping elements 18a, 18b is configured as a lever system and comprises respectively a clamping bolt 20, which is movable to and from by means of a clamping lever 21 between a retracted position according to FIG. 4 and an extended position according to FIG. 3.

The procedure at the first setting-up of the plasticizing unit is to be explained with the aid of FIGS. 5 to 12:

Step 1 (FIGS. 5 and 6):
The drive unit 10 is moved into a rear position and the clamping elements 18a and 18b are in opened position. A fixing element 13 can be placed on the carrier plate 15 between the clamping elements, wherein a certain play is present.

Step 2 (FIGS. 7 and 8):
The plasticizing unit 9 is installed, wherein the rear end of the plasticizing unit 9 is connected with the drive unit 10 by means of a clamping wedge 22.

Step 3 (FIGS. 9 and 10):
The clamping elements 18a and 18b are brought into the closed position.

Step 4 (FIGS. 11 and 12):
By means of the adjusting elements 14a, 14b and 14c the relative position of the support element 12 with respect to the fixing element 13 is changed and namely in a manner such that the nozzle centre is adjusted correctly. This adjusting must be carried out once only per plasticizing unit.

With the aid of FIGS. 13 to 16, the procedure on dismantling of a plasticizing unit for the purpose of exchanging for another plasticizing unit is to be explained.

Step 1 (FIGS. 13 and 14):

The entire injection unit is moved into a rear position and the clamping elements 18a and 18b are brought from the closed position into an opened position. Thereby, the fixing element 13 and thus the plasticizing unit are freed in this region.

Step 2 (FIGS. 15 and 16):

The clamping wedge 22 is released and thus the plasticizing unit 9 is freed from the drive unit 10. The plasticizing unit 9 can now be removed as a whole from the injection moulding machine, wherein the fixing element 13 remains connected via the adjusting elements 14a, 14b, 14c with the plasticizing unit 9 and is dismantled together therewith. On the renewed installation of the plasticizing unit 9 with fixing element 13, the nozzle centre is automatically adjusted through simple closing of the clamping elements 18a and 18b.

LIST OF REFERENCE NUMBERS 1 machine bed
2 clamping unit
3 injection unit
4 fixed platen
5 movable platen
6 clamping cylinder
7 columns
8 support plates
9 plasticizing unit
10 drive unit
11 cylinder
12 support element
13 fixing element
13a first side part of the fixing element 13
13b second side part of the fixing element 13
13c base part of the fixing element 13
14a first adjusting element
14b second adjusting element
14c third adjusting element
15 carrier plate
16a first guide carriage
16b second guide carriage
17a first guide rail
17b second guide rail
18a first clamping element
18b second clamping element
19 nozzle
20 clamping bolt
20 clamping lever
21 clamping wedge
23a guide pins
23b guide grooves

What is claimed is:

1. A plasticizing unit for an injection unit of an injection moulding machine, with a cylinder and with a screw, rotatable therein and movable in axial direction, with a support element arranged beneath the cylinder and connected therewith, and with a fixing element, which surrounds the end of the support element facing away from the cylinder, in such a way that a distance is present between the fixing element and the support element, wherein between the fixing element and the support element several adjusting elements are provided, which are configured to be able to produce a force-fitting and/or form-fitting connection between the fixing element and the support element and to adjust the position of the support element relative to the fixing element in a plane orthogonally to the cylinder axis, wherein three adjusting elements are provided,
wherein a first adjusting element lies with its symmetry axis in the plane which is vertical and containing the cylinder axis,
wherein this first adjusting element is arranged beneath the support element and is configured for an adjusting of the position of the support element relative to the fixing element in vertical direction,
wherein two further adjusting elements are provided, the symmetry axes of which lie in a vertical plane, which lies orthogonally to the cylinder axis,
wherein on each side of the plane which is vertical and containing the cylinder axis respectively one of the two further adjusting elements is arranged and is configured for an adjusting of the position of the support element relative to the fixing element in horizontal direction,
wherein the fixing element has opposing side walls, and wherein the plasticizing unit further comprises:
a carrier plate adapted to support the fixing element thereon, and
a plurality of clamping elements mounted to the carrier plate, wherein each clamping element is operable to selectively engage a respective one of the side walls of the fixing element to removably fix a position of the fixing element relative to the carrier plate.

2. The plasticizing unit according to claim 1, wherein the symmetry axes of all three adjusting elements are arranged in a plane orthogonally to the cylinder axis.

3. The plasticizing unit according to claim 1, wherein the symmetry axes of the two further adjusting elements lie on a common axis.

4. The plasticizing unit according to claim 1, wherein the fixing element has substantially a rectangular and upwardly open cross-section (U-shaped cross-section).

5. An injection unit with the plasticizing unit according to claim 1 and with a drive unit, comprising a rotary and a linear drive for the screw, wherein the plasticizing unit is detachably connectable or connected with the drive unit.

6. The injection unit according to claim 1, wherein a linear guide is provided for the carrier plate, wherein two guide rails, spaced apart from one another, having a suitable cross-section and guide carriages matching hereto are provided, wherein the guide carriages are fastened on the underside of the carrier plate.

7. The injection unit according to claim 1, wherein between the carrier plate on the one hand and the underside of the fixing element on the other hand, guide elements are provided, which are configured and interact in such a way that the fixing element is fixed in position in longitudinal direction of the injection unit and is displaceable orthogonally to the cylinder axis on the carrier plate.

8. An injection moulding machine with a machine bed, a clamping an injection unit according to claim 1, wherein the carrier plate is supported displaceably in longitudinal direction of the machine on or in the machine bed, by means of suitable linear guides.

* * * * *